United States Patent
Nunome et al.

(10) Patent No.: US 12,356,424 B2
(45) Date of Patent: Jul. 8, 2025

(54) TERMINAL AND COMMUNICATION METHOD

(71) Applicant: Panasonic Intellectual Property Corporation of America, Torrance, CA (US)

(72) Inventors: Tomoya Nunome, Ishikawa (JP); Tetsuya Yamamoto, Kanagawa (JP); Hidetoshi Suzuki, Kanagawa (JP); Quan Kuang, Langen (DE); Ayako Horiuchi, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 354 days.

(21) Appl. No.: 17/798,269

(22) PCT Filed: Dec. 2, 2020

(86) PCT No.: PCT/JP2020/044902
§ 371 (c)(1),
(2) Date: Aug. 8, 2022

(87) PCT Pub. No.: WO2021/161627
PCT Pub. Date: Aug. 19, 2021

(65) Prior Publication Data
US 2023/0074018 A1    Mar. 9, 2023

(30) Foreign Application Priority Data

Feb. 13, 2020 (JP) ................................. 2020-022297

(51) Int. Cl.
*H04W 72/00* (2023.01)
*H04W 16/14* (2009.01)
(Continued)

(52) U.S. Cl.
CPC ........... *H04W 72/23* (2023.01); *H04W 16/14* (2013.01); *H04W 72/21* (2023.01)

(58) Field of Classification Search
CPC ..... H04L 1/188; H04L 1/1887; H04L 5/0053; H04L 5/0055; H04W 16/14; H04W 72/21; H04W 72/23
See application file for complete search history.

(56) References Cited

U.S. PATENT DOCUMENTS 10,425,857 B2 * 9/2019 Matsumoto ........... H04W 72/12
10,644,841 B2 * 5/2020 Takeda .................. H04W 72/21
(Continued)

FOREIGN PATENT DOCUMENTS

JP    2017063274 A    3/2017
JP    2017092614 A    5/2017
WO    WO 2016148244 A1    9/2016

OTHER PUBLICATIONS

Intel Corporation, Enhancements to configured grants for NR-unlicensed, 3GPP TSG RAN WG1 Meeting #97, R1-1906788, 11 pages, May 13-17, 2019.*
(Continued)

*Primary Examiner* — Frank Duong
(74) *Attorney, Agent, or Firm* — Seed IP Law Group LLP

(57) ABSTRACT

This terminal comprises a reception circuit that receives parameters pertaining to a license-exempt band, and a control circuit that determines information included in uplink control information on the basis of the parameters.

9 Claims, 10 Drawing Sheets

(51) Int. Cl.
*H04W 72/21* (2023.01)
*H04W 72/23* (2023.01)

(56) References Cited

U.S. PATENT DOCUMENTS

| | | | | |
|---|---|---|---|---|
| 11,785,639 | B2* | 10/2023 | Myung | H04W 74/0808 |
| | | | | 370/329 |
| 11,792,848 | B2* | 10/2023 | Salem | H04W 72/21 |
| | | | | 370/329 |
| 12,225,585 | B2* | 2/2025 | Wu | H04W 74/006 |
| 2018/0020375 | A1 | 1/2018 | Matsumoto et al. | |
| 2018/0212718 | A1 | 7/2018 | Takeda et al. | |
| 2018/0255566 | A1 | 9/2018 | Takeda et al. | |
| 2020/0053778 | A1* | 2/2020 | Babaei | H04W 72/23 |
| 2020/0351919 | A1* | 11/2020 | Oh | H04W 74/006 |
| 2021/0092763 | A1* | 3/2021 | Li | H04W 72/569 |
| 2021/0315053 | A1* | 10/2021 | Kim | H04W 88/14 |
| 2021/0336727 | A1* | 10/2021 | Miao | H04W 72/0446 |
| 2022/0070922 | A1* | 3/2022 | Talarico | H04W 72/1268 |
| 2022/0116152 | A1* | 4/2022 | Iyer | H04L 1/188 |
| 2022/0174699 | A1* | 6/2022 | El Hamss | H04W 72/1268 |
| 2023/0319819 | A1* | 10/2023 | Wang | H04L 5/0048 |
| | | | | 370/336 |

OTHER PUBLICATIONS

Extended European Search Report, dated Jun. 20, 2023, for European Application No. 1 20918515.6-1215. (10 pages).

Intel Corporation, "Enhancements to configured grants for NR-unlicensed," R1-1904288, Agenda Item: 7.2.2.2.4, 3GPP TSG RAN WG1 Meeting #96b, Xi'an, China, Apr. 8-12, 2019. (8 pages).

OPPO, "On configured grant for NR-U," R1-1912509, Agenda Item: 7.2.2.2.4, 3GPP TSG RAN WG1 #99, Reno, USA, Nov. 18-22, 2019. (3 pages).

Sony, "Channel access for NR unlicensed operations," R1-1906834, Agenda Item: 7.2.2.2.1, 3GPP TSG RAN WG1 #96bis, Reno, USA, May 13-17, 2019. (5 pages).

3GPP TR 38.913 V15.0.0, "3rd Generation Partnership Project; Technical Specification Group Radio Access Network; Study on Scenarios and Requirements for Next Generation Access Technologies; (Release 15)," Jun. 2018, 39 pages.

3GPP TS 23.501 V16.1.0, "3rd Generation Partnership Project; Technical Specification Group Services and System Aspects; System Architecture for the 5G System; Stage 2 (Release 16)," Jun. 2019, 368 pages.

3GPP TS 38.211 V15.6.0, "3rd Generation Partnership Project; Technical Specification Group Radio Access Network; NR; Physical channels and modulation (Release 15)," Jun. 2019, 97 pages.

3GPP TS 38.211 V16.0.0, "3rd Generation Partnership Project; Technical Specification Group Radio Access Network; NR; Physical channels and modulation (Release 16)," Dec. 2019, 129 pages.

3GPP TS 38.212 V16.0.0, "3rd Generation Partnership Project; Technical Specification Group Radio Access Network; NR; Multiplexing and channel coding (Release 16)," Dec. 2019, 145 pages.

3GPP TS 38.213 V16.0.0, "3rd Generation Partnership Project; Technical Specification Group Radio Access Network; NR; Physical layer procedures for control (Release 16)," Dec. 2019, 146 pages.

3GPP TS 38.214 V16.0.0, "3rd Generation Partnership Project; Technical Specification Group Radio Access Network; NR; Physical layer procedures for data (Release 16)," Dec. 2019, 147 pages.

3GPP TS 38.300 V15.6.0, "3rd Generation Partnership Project; Technical Specification Group Radio Access Network; NR; NR and NG-RAN Overall Description; Stage 2 (Release 15)," Jun. 2019, 99 pages.

International Search Report, mailed Jan. 12, 2021, for International Application No. PCT/JP2020/044902, 5 pages (with English translation).

\* cited by examiner

TERMINAL AND COMMUNICATION METHOD

TECHNICAL FIELD

The present disclosure relates to a terminal and a communication method.

BACKGROUND ART

The specification of a physical layer for Release 16 new radio access technology (NR) has been completed as functional extension of the 5th generation mobile communication systems (5G) in the 3rd generation partnership project (3GPP). NR supports functions for realizing ultra reliable and low latency communication (URLLC) as well as high speed and large capacity that are basic requirements for enhanced mobile broadband (eMBB) (see, for example, Non Patent Literatures 1 to 4).

CITATION LIST

Non Patent Literature

NPL 1
3GPP IS 38.211 V16.0.0, "NR; Physical channels and modulation (Release 16)," December 2019
NPL 2
3GPP TS 38.212 V16.0.0, "NR; Multiplexing and channel coding (Release 16)," December 2019
NPL 3
3GPP TS 38.213 V16.00, "NR; Physical layer procedure for control (Release 16)," December 2019
NPL 4
3GPP TS 38.214 16.0.0, "NR; Physical layer procedures for data (Release 16)," December 2019

SUMMARY OF INVENTION

There is scope for further study, however, on a method of transmitting uplink control information (e.g., UCI) in an unlicensed band.

One non-limiting and exemplary embodiment facilitates providing a terminal and a communication method each capable of improving transmission efficiency of uplink control information in an unlicensed band.

A terminal according to an embodiment of the present disclosure includes: reception circuitry, which, in operation, receives a parameter related to an unlicensed band; and control circuitry, which, in operation, determines information to be included in uplink control information, based on the parameter.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve transmission efficiency of uplink control information in an unlicensed band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
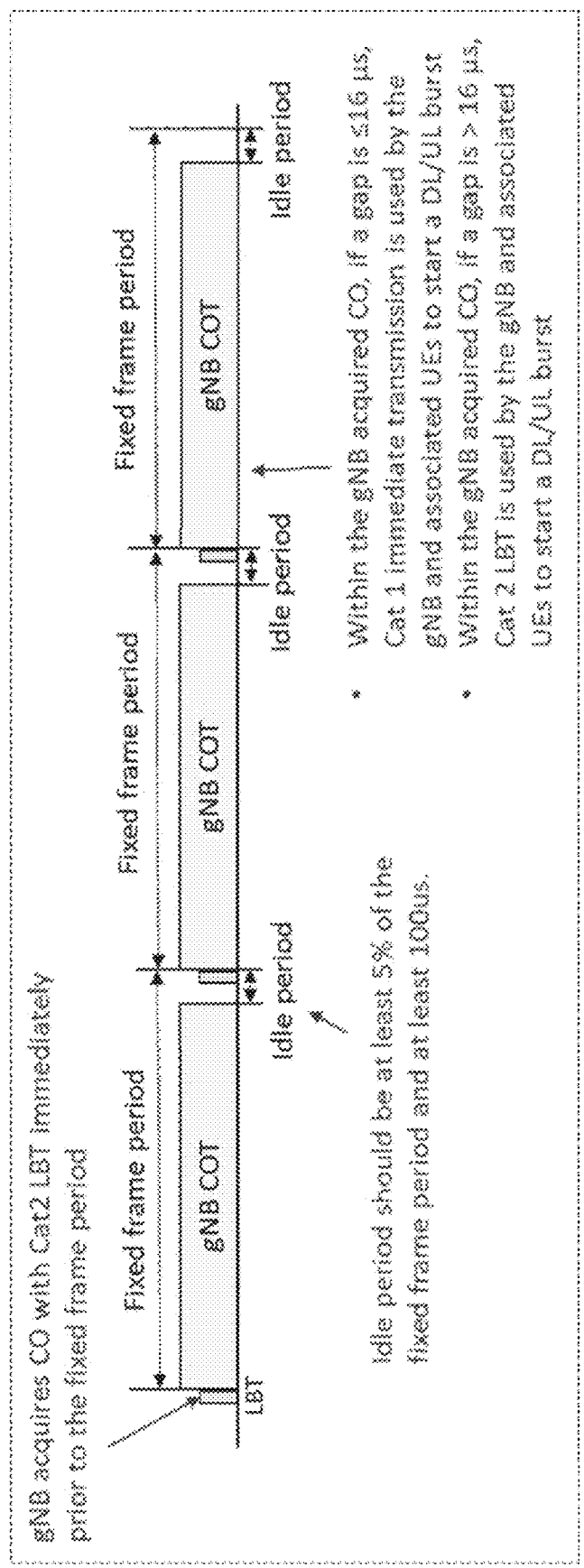
FIG. 1 illustrates exemplary frame based equipment (FBE)

Hereinafter, an embodiment of the present disclosure will be described in detail with reference to the accompanying drawings.
[Unlicensed Frequency Band]
In Release 16 NR, for example, NR-Unlicensed (or also referred to as NR-U) is introduced, in which communication based on an NR radio access scheme is performed in an unlicensed frequency band (or also referred to as an unlicensed band).

In an unlicensed frequency band, for example, each device performs carrier sensing (also referred to as, for example, listen before talk (LBT)) before transmission in order to confirm whether another system or terminal is using the radio channel. In NR-U, for example, whether transmission is possible is determined based on the result of the LBT, and thus it is considered that a terminal (or also referred to as user equipment (UE)) performs a process for detecting the beginning of transmission of a series of downlink data (e.g., downlink burst (DL burst)). In Release 16 NR, for example, the DL burst detection based on a PDCCH is discussed.

Further, extension is considered for Release 17 NR in order to operate, for example, an ultra reliable and low latency communications (URLLC) service in an unlicensed frequency band. In an unlicensed frequency band, for example, interference from another system or the like possibly occurs. An LBT failure due to the interference from another system or the like, for example, causes a transmission stand-by time and possibly increases the delay.

With this regard, it is discussed to operate the URLLC service in an environment where basically no interference from another system or the like occurs, which is referred to as a "controlled environment", for example.
[Configured Grant Transmission]
Configured grant transmission (e.g., configured transmission in a licensed frequency band) supported in Release 15 NR will be described.

The configured grant transmission for uplink data includes, for example, "Configured grant type 1 transmission" and "Configured grant type 2 transmission".

In Configured grant type 1 transmission, for example, information (referred to as, for example, configured grant configuration information) such as a modulation and coding scheme (MCS), radio resource allocation (e.g., allocation of time resources or frequency resources), a transmission timing, and the number of hybrid automatic repeat request (HARQ) processes may be configured (i.e., indicated or instructed) to a terminal by terminal-specific higher layer signaling. When uplink data (e.g., physical uplink shared channel (PUSCH)) is generated, the terminal may, for example, transmit the uplink data based on predetermined configured grant configuration information such as an MCS and a radio resource without a UL grant (i.e., dynamic scheduling information for uplink data) via a downlink control channel (e.g., physical downlink control channel (PDCCH)) from a base station (also referred to as, for example, gNB).

Note that the higher layer signaling is sometimes referred to as, for example, radio resource control (RRC) signaling or a higher layer parameter.

In Configured grant type 2 transmission, for example, the configured grant transmission is activated or released by a PDCCH from the base station. In Configured grant type 2 transmission, for example, information such as the transmission timing and the number of HARQ processes may be configured by the terminal-specific higher layer signaling as in Configured grant type 1 transmission. Information such as the MCS and radio resource allocation information, however, may be configured by downlink control information (DCI) for activation in Configured grant type 2 transmission. When uplink data is generated, for example, the terminal may transmit the uplink data (e.g., PUSCH) by semi-permanently (i.e., statically or semi-statically) using the configured grant configuration information such as the MCS and radio resource configured by the higher layer signaling and the activation DCI (in other words, without a UL grant).

In Release 15 NR, for example, a UL grant is used for retransmission control of the configured grant transmission. For example, an MCS and radio resource allocation information of uplink data for retransmission is controlled by the UL grant.

Additionally, a HARQ process number (or HARQ process ID) used in the configured grant transmission may be uniquely determined from a slot number for transmitting a PUSCH (i.e., transmission timing of the PUSCH), by way of non-limiting example. The PUSCH transmitted in the configured grant transmission may be handled similar to a signal that is initially transmitted, for example, and the redundancy version (RV) may be zero.

[Configured Grant Transmission in Unlicensed Frequency Band]

In the configured grant transmission in NR-U (NR in an unlicensed frequency band), for example, some of parameters (e.g., parameters on retransmission control) used for decoding a PUSCH, such as a HARQ process number, new data indicator (NDI), and RV, may be indicated from a terminal to a base station by uplink control information for the configured grant transmission (referred to as, for example, configured grant uplink control information (CG-UCI)).

The CG-UCI may be transmitted at the same transmission timing (e.g., the same slot) as the PUSCH (or sometimes referred to as CG-PUSCH), for example, using a part of a radio resource allocated to the PUSCH. In other words, the CG-UCI may be multiplexed with the CG-PUSCH.

The reason why the HARQ process number is explicitly indicated using the CG-UCI in NR-U is as follows. For example, in NR-U, the PUSCH is not always transmitted depending on the result of the LBT. For example, in a method of determining the HARQ process number linking with a transmission timing of a PUSCH as in a licensed frequency band, the HARQ process may not be flexibly used depending on whether the PUSCH is actually transmitted. Thus, the HARQ process number is possibly indicated using, for example, the CG-UCI transmitted with the CG-PUSCH.

In addition. NR-U supports an operation of retransmission by a terminal using a radio resource configured for the configured grant without UL grant indication, for example, upon reception of NACK or timer expiration. In this regard, information indicating the state of initial transmission or retransmission (e.g., new data indicator (NDI)) and the RV applied to the PUSCH at the time of retransmission, for example, may be transmitted by the CG-UCI.

In NR-U, for example, HARQ-ACK feedback to the CG-PUSCH may be explicitly indicated from a gNB to UE using information called a downlink feedback indicator (DFI). For example, the HARQ process number for the CG-PUSCH is indicated by the CG-UCI. Thus, when the gNB fails to receive the CG-UCI, for example, the gNB possibly fails to specify which HARQ process data has been transmitted, and it is sometimes not possible to specify the HARQ process and indicate retransmission of the PUSCH. With this regard, the gNB may indicate (i.e., feed hack) HARQ-ACK feedback information for all HARQ processes, for example. The gNB can reduce the overhead caused by the LBT and improve the efficiency of retransmission control by, for example, collectively feeding back HARQ-ACK feedback information for a plurality of PUSCHs to the terminal.

Note that, in retransmission control by the DFI, the MCS and radio resource allocation for the retransmission PUSCH max be the same as in the initial transmission. The DFI may be transmitted in the PDCCH, for example. Further, the DFI may include, for example, another parameter such as a transmission power control (TPC) command in addition to the HARQ-ACK.

[Frame Based Equipment (FBE)]

FBE is one of channel access schemes in NR-U. The FBE is also referred to as, for example, semi-static channel occupancy. FIG. 1 illustrates exemplary FBE.

In the FBE, the gNB may acquire, for example, channel occupancy time (COT) by performing Category 2 LBT (e.g., LBT with a fixed period for carrier sensing) at the beginning of a period called a fixed frame period (FFP), for example. The UE may acquire COT by performing the Category 2 LBT or Category 1 LBT (e.g., LBT without carrier sensing) within the COT of the gNB.

In load based equipment (LBE) (not illustrated), which is another channel access scheme, for example, the UE can attempt to acquire the COT at any time. Meanwhile, in the LBE, there is a case of performing Category 4 LBT that may have an LBT period longer than in Category 2 LBT in the FBE (e.g., LBT with a random period for carrier sensing).

As described above, in the FBE, the UE can acquire the COT in a shorter LBT period as compared with the LBE. In the FBE, however, it is considered providing a period (also referred to as, for example, an idle period) during which both the gNB and the UE cannot perform transmission (in other words, cannot acquire the COT), as illustrated in FIG. 1 for example.

FBE has been described, thus far.

However, it is not fully discussed on a transmission method for maintaining or improving reliability of an uplink signal (e.g., uplink control information or uplink data) in an unlicensed frequency band. In addition, the CG-UCI may be included in a part of the CG-PUSCH in an unlicensed frequency band, for example, so that the amount of resources used in transmitting the CG-PUSCH is possibly increases compared to that in a licensed frequency band.

With this regard, in an embodiment of the present disclosure, a description will be given of a method for maintaining or improving the reliability of the uplink signal and improving transmission efficiency of the uplink signal in an unlicensed frequency band.

Embodiment 1

[Overview of Communication System]

Figure 2:
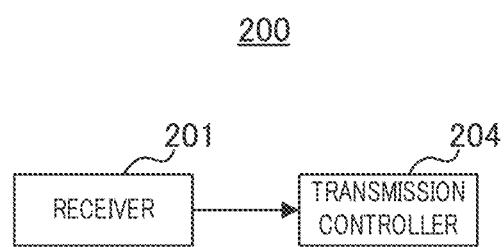
FIG. 2 is a block diagram illustrating an exemplary configuration of a part of a terminal.
Figure 3:
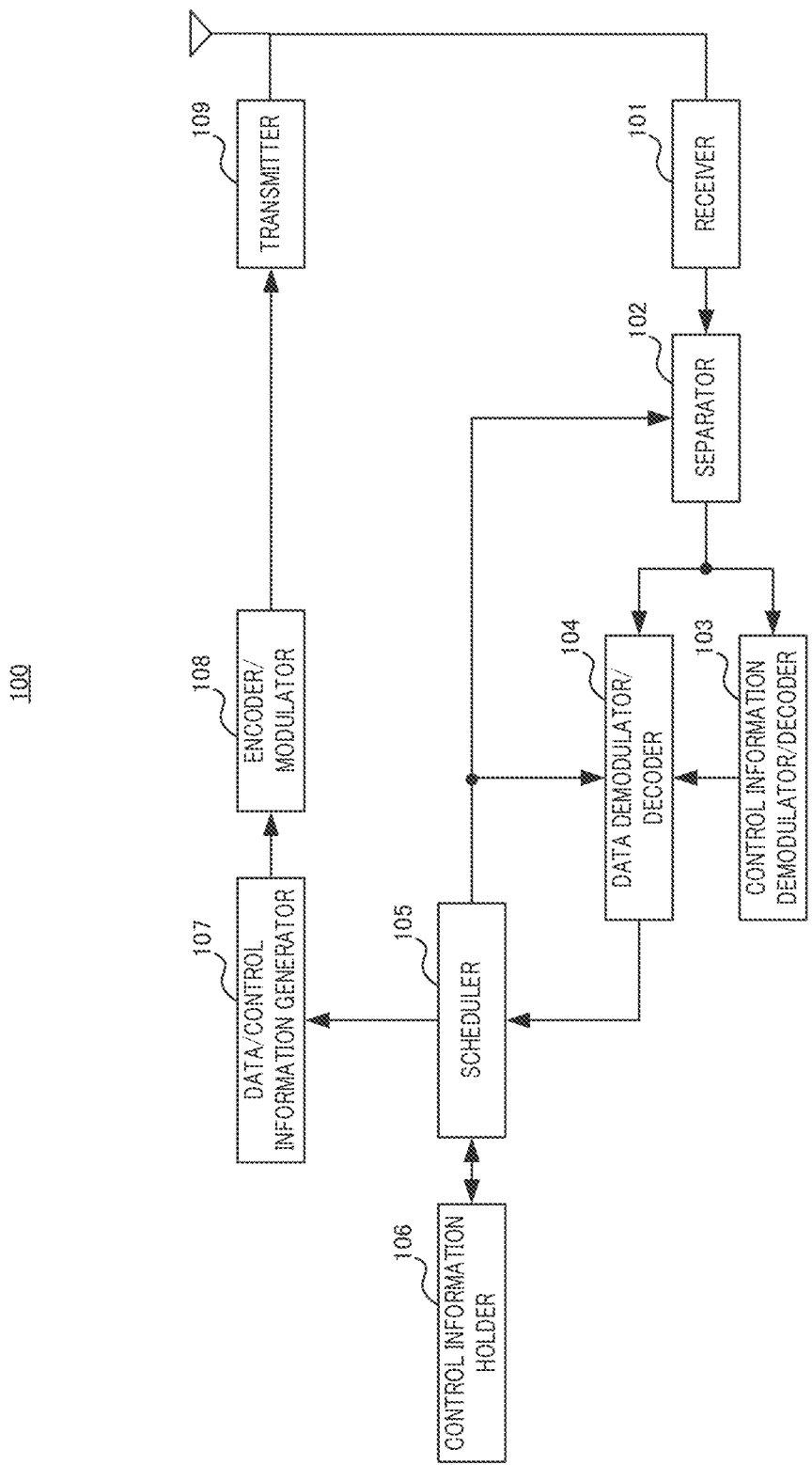
FIG. 3 is a block diagram illustrating an exemplary configuration of a base station.
Figure 4:
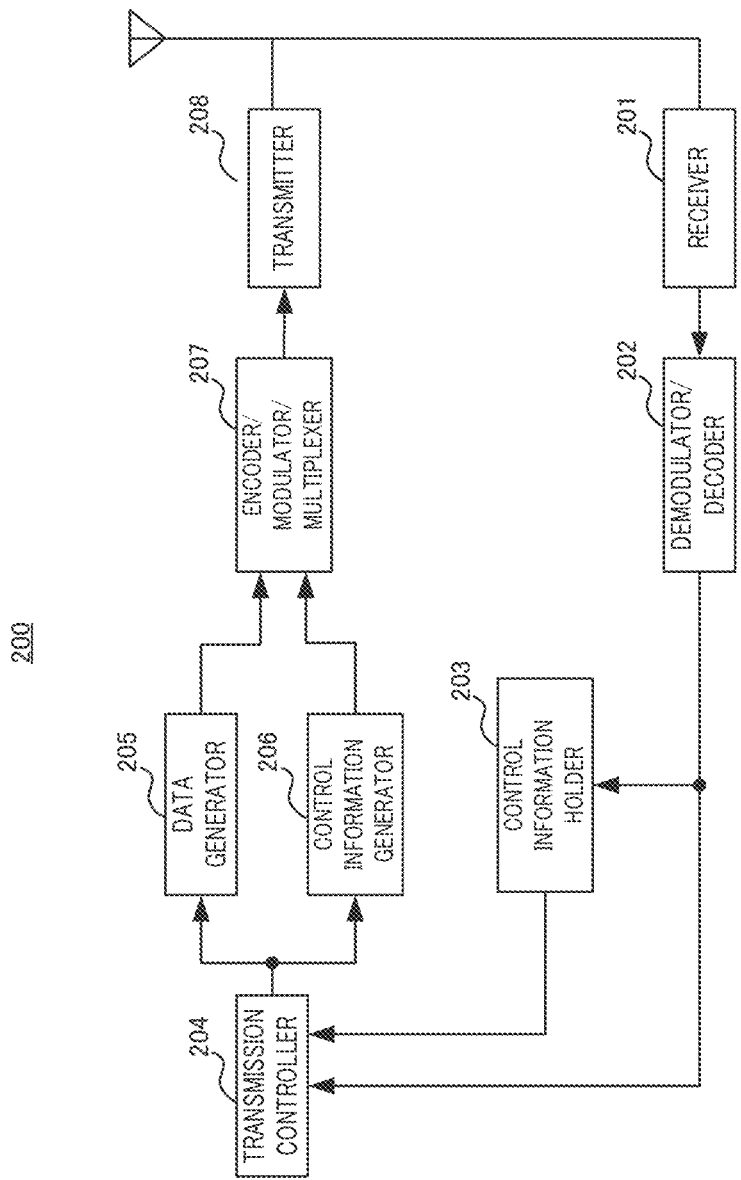
FIG. 4 is a block diagram illustrating an exemplary configuration of the terminal.

A communication system according to an embodiment of the present disclosure may include, for example, base station 100 (e.g., gNB) illustrated in FIG. 3 and terminal 200 (e.g., UE) illustrated in FIGS. 2 and 4.

FIG. 2 is a block diagram illustrating an exemplary configuration of a part of terminal 200 according to an embodiment of the present disclosure. In terminal 200 illustrated in FIG. 3, receiver 201 receives a parameter related to an unlicensed band (e.g., unlicensed frequency band). Transmission controller 204 determines information to be included in uplink control information (e.g., CG-UCI) based on the parameter.

[Configuration of Base Station]

FIG. 3 is a block diagram illustrating an exemplary configuration of base station 100 according to an embodiment of the present disclosure. In FIG. 3, base station 100 includes, receiver 101, separator 102, control information demodulator/decoder 103, data demodulator/decoder 104, scheduler 105, control information holder 106, data/control information generator 107, encoder/modulator 108, and transmitter 109.

Receiver 101 receives a signal transmitted from terminal 200 via an antenna, performs reception processing such as down-conversion or A/D conversion on the received signal, and outputs the received signal after the reception processing to separator 102.

Separator 102 separates the received signal inputted from receiver 101 into a control information portion and a data portion, for example, based on information (e.g., CG-UCI configuration information) inputted from scheduler 105. Separator 102, for example, outputs the control information portion to control information demodulator/decoder 103 and the data portion to data demodulator/decoder 104. Note that the control information may include, for example, the CG-UCI. For example, the received signal includes no control information in some cases.

Control information demodulator/decoder 103 demodulates and decodes, for example, the received signal (e.g., control information portion) inputted from separator 102, and outputs the decoding result (e.g., CG-UCI) to data demodulator/decoder 104. Note that control information demodulator/decoder 103 need not output a signal to data demodulator/decoder 104 when, for example, the received signal includes no CG-UCI.

Data demodulator/decoder 104 demodulates and decodes the data portion inputted from separator 102 based on, for example, the CG-UCI inputted from control information demodulator/decoder 103 and scheduling information inputted from scheduler 105, and outputs the decoding result to scheduler 105.

Scheduler 105 determines a parameter and the size (e.g., the number of bits) to be included in the CG-UCI, for example, based on control information (e.g., configured grant configuration information) inputted from control information holder 106. Scheduler 105, for example, outputs the determined information (referred to as, for example, CG-UCI configuration information) to separator 102 and data demodulator/decoder 104.

Scheduler 105 also indicates generation of HARQ-ACK feedback information to data/control information generator 107 when performing retransmission control by explicit HARQ-ACK information based on the data decoding result inputted from data demodulator/decoder 104, for example. When transmitting signaling information, scheduler 105 indicates generation of the signaling information to data/control information generator 107. Scheduler 105 may also indicate generation of data or control information to data/control information generator 107, for example.

Control information holder 106, for example, holds configured grant configuration information (e.g., MCS and radio resource allocation information) for each terminal 200. Control information holder 106 may, for example, output the held information to respective components of base station 100 (e.g., scheduler 105) as necessary.

Data/control information generator 107 generates data or control information according to the indication from scheduler 105, for example, and outputs a signal including the generated data or control information to encoder/modulator 108. For example, data/control information generator 107 may generate the control information based on the HARQ-ACK feedback information or the indication of generating the signaling information inputted from scheduler 105.

Encoder/modulator 108 encodes and modulates the signal inputted from data/control information generator 107, for example, and outputs the modulated signal (symbol sequence) to transmitter 109.

Transmitter 109 performs transmission processing such as D/A conversion, up-conversion, or amplification on the signal inputted from encoder/modulator 108, and transmits a radio signal obtained by the transmission processing to terminal 200 from the antenna.

[Configuration of Terminal]

FIG. 4 is a block diagram illustrating an exemplary configuration of terminal 200 according to an embodiment of the present disclosure. In FIG. 4, terminal 200 includes receiver 201, demodulator/decoder 202, control information holder 203, transmission controller 204, data generator 205, control information generator 206, encoder/modulator/multiplexer 207, and transmitter 208.

Receiver 201 performs reception processing such as down-conversion or A/D conversion on a received signal received via an antenna, for example, and outputs the received signal to demodulator/decoder 202.

Demodulator/decoder 202 demodulates and decodes data or control information included in the received signal inputted from receiver 201, for example, and outputs the decoding result to transmission controller 204. The control information may include, for example, the HARQ-ACK feedback information. For example, demodulator/decoder 202 also outputs the signaling information included in the decoding result to control information holder 203.

Control information holder 203 holds, for example, the signaling information (e.g., configured grant configuration information) inputted from demodulator/decoder 202, and outputs the held information to respective components (e.g., transmission controller 204) as necessary.

Transmission controller 204 determines a parameter or the size (e.g., the number of bits) to be included in the CG-UCI, for example, based on the decoding result of the control information or data inputted from demodulator/decoder 202 and the configured grant configuration information inputted from control information holder 203. Transmission controller 204 indicates generation of control information (e.g., CG-UCI) to control information generator 206 based on the determined information, for example. Transmission controller 204 also indicates generation of data (e.g., CG-PUSCH) to data generator 205, for example.

Data generator 205 generates the transmission data (e.g., CG-PUSCH) based on, for example, the indication of generating the data inputted from transmission controller 204, and outputs the transmission data to encoder/modulator/multiplexer 207.

Control information generator 206 generates the control information (e.g., CG-UCI) based on, for example, the indication of generating the control information inputted from transmission controller 204, and outputs the control information to encoder/modulator/multiplexer 207.

Encoder/modulator/multiplexer 207 encodes and modulates, for example, the transmission data inputted from data generator 205 and the control information inputted from control information generator 206. Encoder/modulator/multiplexer 207 also multiplexes the data and control information, for example, and outputs the signal to transmitter 208.

Transmitter 208, for example, performs transmission processing such as D/A conversion, up-conversion, or amplification on the signal inputted from encoder/modulator/multiplexer 207, and transmits a radio signal obtained by the transmission processing to base station 100 from the antenna.

[Operations of Base Station 100 and Terminal 200]

Exemplary operations in base station 100 and terminal 200 having the above configurations will be described.

Figure 5:
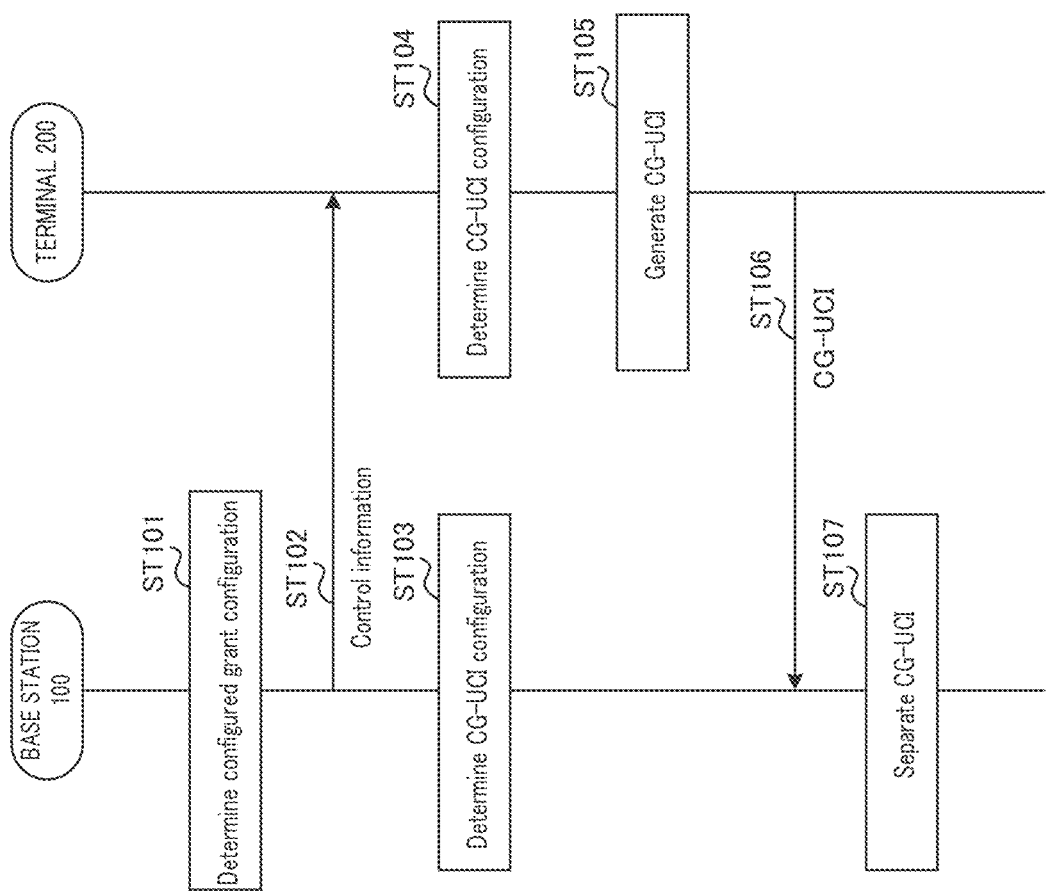
FIG. 5 is a sequence diagram describing exemplary operations of the base station and the terminal.

FIG. 5 is a sequence diagram describing exemplary operations of base station 100 and terminal 200.

Base station 100 determines, for example, configured grant configuration for terminal 200 (ST101). The configured grant configuration may include, for example, the MCS, radio resource allocation, transmission timing, and information on the HARQ process.

Base station 100 transmits control information to terminal 200 (ST102). The control information may include, for example, the configured grant configuration information.

Base station 100 determines the configuration of the CG-UCI for terminal 200, for example, based on the configured grant configuration information (ST103). Further, terminal 200 determines the configuration of the CG-UCI, for example, based on the configured grant configuration information transmitted from base station 100 (ST104). For example, base station 100 and terminal 200 may determine information to be included in the CG-UCI (also referred to as, for example, a CG-UCI parameter) based on a parameter related to an unlicensed frequency band (e.g., configured grant configuration information or information on the unlicensed frequency band). In other words, base station 100 and terminal 200 may determine information that is not included in the CG-UCI. For example, base station 100 and terminal 200 may determine the size of the CG-UCI in controlling the information included in the CG-UCI. For example, the CG-UCI configuration may include a configuration of a mode on the CG-UCI parameter, the example of which will be described later.

Terminal 200 generates the CG-UCI based on the CG-UCI configuration (ST105), for example, and transmits the generated CG-UCI to base station 100 (ST106).

Base station 100 separates the CG-UCI from the received signal received from terminal 200, for example, based on the CG-UCI configuration for terminal 200 (ST107).

[CG-UCI Parameter Determination Methods]

A description will be given of exemplary CG-UCI parameter determination methods (e.g., processes of ST103 and ST104 in FIG. 5) in base station 100 (e.g., scheduler 105) and terminal 200 (e.g., transmission controller 204).

In an unlicensed frequency band, the CG-UCI parameter included in the CG-UCI may be determined depending on the mode, for example. The mode includes, for example, a "reduced mode" in which the number of bits of the CG-UCI is reduced, and an "unreduced mode" in which the number of bits of the CG-UCI is not reduced. Exemplary mode determination methods will be described later.

Note that "the number of bits" may be replaced with "bit size" or "bit length", for example. Also, "mode" may be replaced with "method" or "type", for example.

In the reduced mode of the CG-UCI, for example, at least some of the CG-UCI parameters are reduced. The parameter to be reduced may include, for example, the following parameters (e.g., HARQ process number or retransmission parameter).

In the following, a description will be given of a case where information on the HARQ process number is not included in the CG-UCI in the reduced mode.

In the reduced mode, for example, the CG-UCI need not include the information on the HARQ process number.

Meanwhile, in the reduced mode, the HARQ process number may be determined (i.e., calculated) based on, for example, the transmission timing of the CG-PUSCH. The method of calculating the HARQ process number includes, for example, the following methods.

<HARQ Process Number Calculation Method 1>

The HARQ process number may be calculated, for example, based on a system frame number (SFN) and symbol number at which the CG-PUSCH is transmitted. In other words, in Calculation Method 1, the HARQ process number may be determined by the same method as in a licensed frequency band (e.g., licensed band), for example.

<HARQ Process Number Calculation Method 2>

The HARQ process number may be calculated, for example, based on a relative timing within a gNB COT.

For example, the HARQ process number may be determined by the following determination methods based on the beginning of the gNB COT (or a certain timing in the COT).

Determination Method 1:

In Determination Method 1, for example, the HARQ process numbers of the same pattern may be configured among a plurality of COTs.

For example, the HARQ process number (HARQ process ID) may be defined according to the following equation:

HARQ Process ID=[floor(CURRENT_symbol/periodicity)] modulo nrofHARQ-Processes.

Here, the CURRENT_symbol indicates the number of symbols from the first symbol of the COT, the periodicity indicates a transmission period of the configured grant, and the nrofHARQ-Processes indicates the number of HARQ processes allocated to the configured grant. The function floor(x) indicates a floor function that returns the largest integer less than or equal to x.

Determination Method 2:

In Determination Method 2, for example, the HARQ process numbers of different patterns may be configured among a plurality of COTs.

For example, the HARQ process number (HARQ process ID) may be defined according to the following equation:

HARQ Process ID=[floor(CURRENT_symbol/periodicity)+$n$] modulo nrofHARQ-Processes.

Here, the n represents a value indicated from the gNB to the UE for each COT. The CURRENT_symbol, periodicity, and nrofHARQ-Processes indicate the same as in Determination Method 1.

For example, Determination Method 1 does not need a process for sharing recognition between base station 100 (e.g., gNB) and terminal 200 (e.g., UE), such as predetermining signaling or a pattern modification method for respectively applying different patterns of the HARQ process numbers for the COTs as in Determination Method 2. Thus, Determination Method 1 needs simpler processing or is unlikely to cause misrecognition between the gNB and the UE, for example, which is the advantage over Determination Method 2.

Meanwhile, Determination Method 2 allows a different HARQ process to be used in a different COT even when not all HARQ processes assigned to the configured grant are assigned in a single COT, as in a case where the COT length is shorter, where the periodicity is longer, or where more HARQ processes are assigned to the configured grant, for example. Thus, more HARQ processes can be used in Determination Method 2, for example, which is an advantage over Determination Method 1.

Note that which of Determination Method 1 and Determination Method 2 is applied may be determined according to, for example, at least one of the COT length (e.g., maximum COT length), the periodicity, and the number of HARQ processes of the configured grant. For example, Determination Method 1 may be applied when the number of HARQ processes is equal to or less than a threshold, and Determination Method 2 may be applied when the number of HARQ processes is greater than the threshold. This allows appropriate determination method selection according to the maximum COT length, the periodicity, or the number of HARQ processes, for example. Note that the threshold may be determined or indicated based on a parameter such as the maximum COT length, for example.

HARQ process number calculation method 2 has been described, thus far.

As described above, in the reduced mode, the number of bits of the CG-UCI can be reduced by reducing the HARQ process number, thereby improving reliability of the CG-UCI compared with the unreduced mode when the same size resource is used, for example.

A description has been given of the case where the information on the HARQ process number is not included in the CG-UCI in the reduced mode.

Meanwhile, in the unreduced mode, the HARQ process number is determined by terminal 200, for example, and indicated to base station 100 by the CG-UCI, Thus, in a possible environment where an LBT failure occurs and terminal 200 cannot perform PUSCH transmission on a configured grant resource (hereinafter referred to as a CG resource), for example, the HARQ process can be effectively used by the determination of the HARQ process number by terminal 200 and the indication by the CG-UCI.

Next, a description will be given of a case where retransmission parameters such as NDI and RV are not included in the CG-UCI in the reduced mode.

In the reduced mode, for example, the CG-UCI need not include the retransmission parameters such as the NDI and RV.

In addition, the reduced mode need not support retransmission on a CG resource using the HARQ-ACK feedback information (e.g., DFI) or a retransmission timer, for example, and may support retransmission by the UL grant. In the URLLC, for example, the transmission with higher reliability sometimes makes retransmission less likely to occur compared to other types of services. Also, in an environment where the LBT failure is less likely to occur, the HARQ-ACK feedback is less likely to be interfered. In such cases, there is little need to perform collective HARQ-ACK feedback to a plurality of HARQ processes using the DFI or to control retransmission using a retransmission timer. Thus, when the URLLC service is applied or in the environment where the LBT failure is less likely to occur, for example, the retransmission parameters need not be included in the CG-UCI and the retransmission on a CG resource using the DFI or retransmission timer need not be supported in the reduced mode.

In the case where the retransmission on a CG resource is not supported, transmission on the CG resource is not retransmission but initial transmission. At the time of initial transmission, for example, it may be assumed that the NDI is toggled and RV=0. This eliminates the need for the retransmission parameters such as the NDI and RV.

As described above, in the reduced mode, the number of bits of the CG-UCI can be reduced by reducing the retransmission parameters, thereby improving reliability of the CG-UCI compared with the unreduced mode when the same size resource is used, for example. Further, for example, since the DFI for retransmission need not be provided, overhead of control information in downlink can be reduced.

A description has been given of the case where the information on the retransmission parameters is not included in the CG-UCI in the reduced mode.

Meanwhile, the unreduced mode may support, for example, the retransmission on a CG resource using the DFI or retransmission timer. In the unreduced mode, for example, the retransmission parameters such as the NDI and RV are determined by terminal 200 and indicated to base station 100 by the CG-UCI. This enables retransmission control using a CG resource in the unreduced mode, for example, in an environment where the LBT failure possibly occurs, thereby improving efficiency of the retransmission control such as increasing retransmission opportunities.

As described above, reducing the number of bits of the CG-UCI in the reduced mode realizes transmission and reception of reliable CG-UCI (e.g., when transmitting CG-UCI) and CG-PUSCH with fewer resources, compared with, for example, a case of not reducing the number of bits of the CG-UCI. In addition, the unreduced mode realizes retransmission control with improved usage efficiency of the HARQ process, for example, when the LBT failure may occur due to interference from another system or the like. Accordingly, switching between the reduced mode and unreduced mode, for example, makes it possible to properly use the control for increasing the reliability by reducing PUSCH resources and the control for increasing the tolerance to the LBT failure. Thus, base station 100 and terminal 200, for example, can control the CG-UCI depending on the radio propagation environment (or state) between base station 100 and terminal 200.

Note that, in the reduced mode, for example, at least one of the HARQ process number and the retransmission parameters described above may be reduced. Alternatively, all CG parameters included in the CG-UCI may be reduced in the reduced mode. In this case, terminal 200 need not transmit the CG-UCI, and thus need not perform the transmission and reception processing for the CG-UCI.

Although at least one of the HARQ process number and the retransmission parameters is reduced in the reduced mode here, the parameter to be reduced may be a parameter other than the HARQ process number and the retransmission parameters. For example, the coding rate of the CG-UCI can be reduced by reducing a parameter other than the HARQ process number and the retransmission parameters, thereby improving the reliability of the CG-UCI as described above.

Further, the number of bits of a parameter, for example, may be reduced in the reduced mode instead of eliminating the parameter itself. For example, the number of bits of the RV may be set to 1 bit in the reduced mode whereas the number of bits of the RV is set to 2 bits in the unreduced mode. This makes it possible to reduce the number of bits of the CG-UCI while leaving the indication of the RV by the CG-UCI, for example, when retransmission is less likely to occur and two patterns of RVs (e.g., RV=0, 3, etc.) are used.

CG-UCI parameter determination methods have been described, thus far.

Next, exemplary mode determination methods will be described.

For example, terminal 200 may determine the mode (i.e., information to be included in the CG-UCI or information not to be included in the CG-UCI) based on a parameter related to an unlicensed frequency band. The parameter related to an unlicensed frequency band may be, for example, a parameter configured or indicated to terminal 200 in the unlicensed frequency band, or a parameter related to a radio propagation environment of terminal 200 in the unlicensed frequency band.

<Determination Method 1>

In Determination Method 1, the mode may be explicitly configured, for example, by semi-static signaling such as higher layer signaling (e.g., RRC signaling).

For example, a parameter indicating either the reduced mode or the unreduced mode may be added to the semi-static signaling.

In addition, the semi-static signaling includes, for example, cell specific signaling and UE specific signaling.

Cell Specific Signaling:

For example, it is assumed that the URLLC service is operated in the controlled environment.

In addition, whether it is the controlled environment can be assumed not to change depending on local areas. For example, it can be assumed that whether it is the controlled environment is determined for each cell. Thus, the mode may be determined for each cell based on whether it is the controlled environment, for example.

An indication of the mode by the cell specific signaling makes it possible to, for example, apply the same processing to terminals 200 in the cell, thereby simplifying the control and processing in base station 100 (e.g., gNB).

UE Specific Signaling:

An indication of the mode by UE specific signaling is effective, for example, when the LBT failure occurs in some of a plurality of UEs, or when the URLLC service is applied to some of a plurality of UEs.

This mode configuration by the UE specific signaling may be linked with the configured grant configuration, for example. For example, the mode may be configured for each configured grant configuration. Transmission and reception of the CG-UCI and DFI are possible between base station 100 (gNB) and terminal 200 (UE) by, for example, sharing the recognition of the mode for each terminal 200 (e.g., UE) or each configured grant configuration. Thus, different modes, for example, may be configured together in a cell.

As described above, the indication of the mode by the UE specific signaling enables the configuration of the mode suitable for each UE or each configured grant configuration, for example, among the processing of reducing PUSCH resources (i.e., reduced mode) and the processing under the assumption of the LBT failure (i.e., unreduced mode).

The cell specific signaling and UE specific signaling have been described, thus far.

The mode is explicitly indicated in Determination Method 1 as described above, and base station 100 can appropriately configure one of the following according to, for example, the radio state between base station 100 and terminal 200; the processing of reducing PUSCH resources (e.g., reduced mode); and the processing under the assumption of the LBT failure (e.g., unreduced mode).

Note that, although the mode is explicitly indicated in Determination Method 1, the present disclosure is not limited to this. For example, base station 100 may indicate signaling indicating whether it is the controlled environment to terminal 200, and terminal 200 may configure (e.g., change) the mode linking with the signaling. For example, the reduced mode may be configured for the controlled environment (e.g., environment without interference from another system), and the unreduced mode may be configured for an environment other than the controlled environment (e.g., environment where interference from another system possibly occurs). In a case where the signaling indicating whether it is the controlled environment is also used for processing other than the mode configuration, for example, the signaling indicating whether it is the controlled environment can be shared and the signaling overhead can be reduced.

<Determination Method 2>

In Determination Method 2, the modes may be configured, for example, by dynamic signaling. The dynamic signaling includes, for example, a PDCCH used for activation or reactivation in configured grant type 2.

Indication methods in Determination Method 2 will be described below.

Indication Method 1:

The mode may be explicitly indicated, for example, by a parameter included in the PDCCH. For example, a parameter of 1 bit may be added to the PDCCH. For example, base station 100 may indicate to terminal 200 the parameter of 1 bit indicating either the reduced mode or the unreduced mode.

Indication Method 2:

The mode may be linked with a DCI format, for example. For example, terminal 200 may configure either the reduced mode or the unreduced mode based on the DCI format.

For example, DCI format 0_2 may be linked with the reduced mode, and DCI formats 0_0 and 0_1 may be linked with the unreduced mode. For example, DCI format 0_2 is assumed to be used for the URLLC service. It is also assumed that the URLLC service is operated, for example, in an environment where the LBT failure is less likely to occur (e.g., environment without interference from another system, such as the controlled environment). Thus, when DCI format 0_2 is used, it is assumed that the LBT failure is less likely to occur in the environment, and the reduced mode may be configured.

Compared to Indication Method 1, the additional parameter is not necessary for the PDCCH in Indication Method 2, thereby reducing the signaling overhead. Indication Method 1 is effective, however, in that the reduced mode and the unreduced mode can be switched regardless of the DCI format.

As described above, in Determination Method 2, the mode can be changed by the PDCCH, for example, so that the mode can be changed more dynamically compared to the method of using the semi-static signaling as in Determination Method 1.

<Determination Method 3>

In Determination Method 3, the mode may be configured (i.e., changed) based on, for example, priority of the configured grant (i.e., parameter on priority).

For example, in the configured grant, the priority may be configured semi-statically for each configured grant configuration. In Release 16 NR, for example, the priority is configured to High or Low. In addition, the priority (e.g., High or Low) may be configured to terminal 200 by, for example, higher layer signaling (e.g., priority (e.g., High or Low) in configuredGrantConfig).

When the priority is High, for example, the URLLC service is assumed to be applied. Further, as described above, it is assumed that the URLLC service is operated, for example, in an environment where the LBT failure is less likely to occur (e.g., environment without interference from another system, such as the controlled environment). Thus, terminal 200 may configure the reduced mode when the priority is High, and configure the unreduced mode when the priority is Low, for example.

According to Determination Method 3, the mode can be switched without additional signaling, thereby reducing the signaling overhead.

<Determination Method 4>

In Determination Method 4, the mode may be configured (i.e., changed) based on a parameter on a channel access scheme (e.g., FBE or LBE), for example.

The channel access scheme may be configured to terminal 200 by, for example, higher layer signaling (e.g., ChannelAccessMode-r16 (e.g., semi-static or dynamic)).

For example, in the FBE mode, the presence of a system that possibly causes interference prevents efficient operation in some cases. In the FBE mode, for example, the transmission start timing is determined in advance, so that terminal 200 possibly stands by for transmission until the transmission start timing even when there is no interference from another system. With this regard, it is possible to assume in the operation in the FBE mode that there is a case where no other system that causes interference is considered to be present.

Meanwhile, it is easier in the LBE mode to coexist with another system, for example, as compared with the FBE mode. Thus, interference from another system, for example, can be assumed in the operation in the LBE mode.

Then, terminal 200 may configure the reduced mode when the FBE mode is configured, and configure the unreduced mode when the LBE mode is configured, for example.

According to Determination Method 3, the mode can be switched without additional signaling, thereby reducing the signaling overhead.

<Determination Method 5>

In Determination Method 5, the mode may be configured (i.e., changed) based on, for example, a parameter on the MCS. The parameter on the MCS may be, for example, an MCS table or MCS index.

Exemplary mode determination in Determination Method 5 will be described below.

Method 1:

The mode may be determined based on, for example, an MCS table of the CG-PUSCH.

For the PUSCH transmission, for example, terminal 200 (e.g., UE) selects and indicates an MCS index used by base station 100 (e.g., gNB) for the transmission, and this enables appropriate selection of a modulation scheme and coding rate according to the communication quality. Meanwhile. NR assumes a use case, such as the URLLC, the required reliability of which is much higher than that for other services, for example. Thus, NR is specified so that an MCS table to be used can be changed among a plurality of MCS tables according to the use case or the service corresponding to the transmission data, instead of supporting a plurality of use cases with a single MCS table, for example.

Note that the MCS table to be used may be configured (i.e., indicated) to terminal 200 by, for example, the RRC signaling, DCI format, or radio network temporary identifier (RNTI).

Terminal 200 may configure the reduced mode when an MCS table for high reliability (i.e., MCS table supporting a lower coding rate than a normal MCS table) is used, and configure the unreduced mode when the normal MCS table is used, for example.

This is because it is assumed that data of the URLLC service is transmitted and received when the MCS table for high reliability is used and that the LBT failure is less likely to occur in the environment.

The above method enables mode switching without additional signaling, thereby reducing signaling overhead.

Method 2:

The mode may be determined based on, for example, an MCS index of the CG-PUSCH.

Note that the MCS index to be used may be configured (i.e., indicated) to terminal 200 by, for example, the RRC signaling or PDCCH.

The modulation scheme and coding rate are determined, for example, depending on the MCS index. For example, a combination of the modulation scheme and coding rate with high reliability can be configured when the MCS index is lower. For example, by linking the use of the MCS index lower than a threshold and an operation of transmitting and receiving data of the URLLC service (e.g., reduced mode), it can be considered that the LBT failure is less likely to occur in the environment when the MCS index lower than the threshold is used, for example.

Thus, terminal 200 may configure the reduced mode when the MCS index is low (e.g., equal to or less than a threshold) and configure the unreduced mode when the MCS index is high (e.g., greater than the threshold), for example.

Note that the threshold may be indicated (i.e., configured) to terminal 200 by signaling, or may be specified in the standard, for example. In addition, the threshold may be configured for each MCS table, for example.

This method enables mode switching without additional signaling, thereby reducing signaling overhead.

Note that, although the MCS index and threshold are compared above by way of example, terminal 200 may configure the mode based on comparison between the coding rate corresponding to the MCS index and the threshold, for example.

The above-described Method 1 and Method 2 may be combined. For example, even when the MCS table for high reliability is used, the coding rate is possibly higher at a higher MCS index. With this regard, finer control is enabled by combining these methods.

Determination Methods 1 to 5 have been described, thus far.

In the present embodiment, terminal 200 controls information included in the CG-UCI (e.g., uplink control information on allocation of resources configured to terminal 200) based on a parameter related to an unlicensed frequency band.

With this control, for example, the size (e.g., number of bits) of the CG-UCI may vary depending on the radio propagation environment between base station 100 and terminal 200. For example, the reduced mode can improve the reliability of the CG-UCI while reducing the size of the CG-UCI. Meanwhile, the control under the assumption of the LBT failure in the unreduced mode (e.g., keeping the size of the CG-UCI) maintains the reliability of the CG-UCI. Thus, according to the present embodiment, it is possible to maintain or improve the reliability of an uplink signal and to improve the transmission efficiency of the uplink signal in an unlicensed frequency band (i.e., unlicensed band).

An embodiment of the present disclosure has been described, thus far.

OTHER EMBODIMENTS

In the above-described embodiment, when the reduced mode is applied, a different parameter, which may be a parameter for the URLLC, may be included instead of the reduced parameter, for example. In other words, a bit for a certain reduced parameter may be allocated to a different parameter. For example, the different parameter may include information to facilitate separation in the gNB upon reception when the same resource (e.g., at least one of the time domain, frequency domain, and DMRS configuration) is used for different UEs or different configured grant configurations. This information may be, for example, a UE ID, or configured grant configuration ID. The addition of the different parameter allows base station 100, for example, to improve the accuracy of the signal separation when the same resource is used for different UEs or different configured grant configurations, thereby improving the reliability.

Further, in the above-described embodiment, an additional parameter may be further included in the CG-UCI in the unreduced mode. The additional parameter may include, for example, the UE ID or configured grant configuration ID as described above. For example, in a case where the unreduced mode is selected when there are sufficient resources for the CG-UCI, the additional parameter allows base station 100, for example, to improve the accuracy of the signal separation when the same resource is used for different UEs or different configured grant configurations, thereby improving the reliability.

Additionally, in the above-described embodiment, the above-described mode determination methods are not limited to being switched according to the reduction of the number of bits of the CG-UCI, and may be switched between, for example, in a processing method in a case where high reliability is required and in a processing method in a case where high reliability is not required.

Further, in the above-described embodiment, the mode is configured based on, for example, the information explicitly indicating the mode, the priority of the configured grant, the channel access scheme, or the parameter such as the MCS index (or MCS table), which are indicated from base station 100 to terminal 200. The parameter used for configuring the mode, however, is not limited to these, and may be another parameter that may be configured for the URLLC service, or still another parameter that may be configured in an environment where the LBT failure (i.e., interference from another system) is expected (or an environment where no interference is expected), for example.

The uplink data channel is not limited to the PUSCH in the embodiment described above, and may be another control channel with a different name.

The embodiments described above may be applied in combination.

<5G NR System Architecture and Protocol Stacks>

3GPP has been working at the next release for the 5th generation cellular technology, simply called 5G, including the development of a new radio (NR) access technology operating in frequencies ranging up to 100 GHz. The first version of 5G standard was initially delivered in late 2017, which allows proceeding to trials and commercial deployments of 5G NR standard-compliant terminals, e.g., smartphones.

Figure 6:
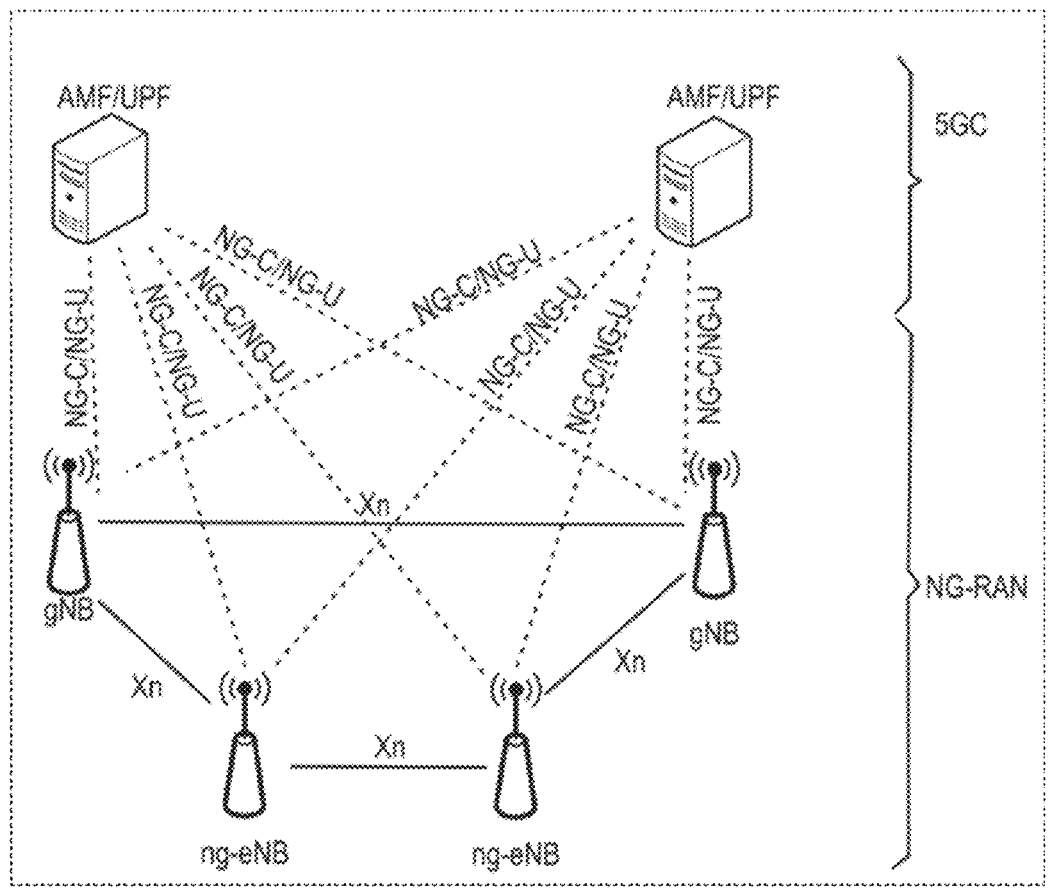
FIG. 6 illustrates an exemplary architecture for a 3GPP NR system.

For example, the overall system architecture assumes a Next Generation-Radio Access Network (NG-RAN) that includes gNBs. The gNBs provide the NG-radio access user plane (SDAP/PDCP/RLC/MAC/PHY) and control plane (RRC) protocol terminations towards a UE. The gNBs are interconnected with each other via an Xn interface. The gNBs are also connected to the Next Generation Core (NGC) via the Next Generation (NG) interface, more specifically to the Access and Mobility Management Function (AMF; e.g. a particular core entity performing the AMF) via the NG-C interface, and to the User Plane Function (UPF; e.g. a particular core entity performing the UPF) via the NG-U interface. The NG-RAN architecture is illustrated in FIG. 6 (see, for example, 3GPP TS 38.300 v15.6.0, section 4).

The user plane protocol stack for NR (see, for example, 3GPP TS 38.300, section 4.4.1) includes the Packet Data Convergence Protocol (PDCP, see clause 6.4 of TS 38.300) Radio Link Control (RLC, see clause 6.3 of TS 38.300) and Medium Access Control (MAC, see clause 6.2 of TS 38.300) sublayers, which are terminated in the gNB on the network side. Additionally, a new access stratum (AS) sublayer (Service Data Adaptation Protocol: SDAP) is introduced above the PDCP (see, for example, clause 6.5 of 3GPP TS 38.300). A control plane protocol stack is also defined for NR (see, for example, TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For example, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For example, the physical channels include a Physical Random Access Channel (PRACH), Physical Uplink Shared Channel (PUSCH), and Physical Uplink Control Channel (PUCCH) as uplink physical channels, and a Physical Downlink Shared Channel (PDSCH), Physical Downlink Control Channel (PDCCH), and Physical Broadcast Channel (PBCH) as downlink physical channels.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, the eMBB is expected to support peak data rates (20 Gbps for downlink and 10 Gbps for uplink) and user-experienced data rates in the order of three times what is offered by IMT-Advanced. Meanwhile, in a case of the URLLC, the tighter requirements are put on ultra-low latency (0.5 ms for each of UL and DL for user plane latency) and high reliability (1-10-5 within 1 ms). Finally, the mMTC may preferably require high connection density (1,000,000 devices/km2 in an urban environment), large coverage in harsh environments, and extremely long-life battery for low cost devices (15 years).

Thus, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (also referred to as TTI) than an mMTC service. Furthermore, deployment scenarios with large channel delay spreads may preferably require a longer CP duration than scenarios with short delay spreads. The subcarrier spacing may be optimized accordingly to retain the similar CP overhead. NR may support more than one value of subcarrier spacing. Correspondingly, subcarrier spacing of 15 kHz, 30 kHz, 60 kHz . . . are currently considered. The symbol duration Tu and the subcarrier spacing $\Delta f$ are directly related through the formula $\Delta f = 1/Tu$. In a similar manner as in LTE systems, the term "resource element" can be used to denote a minimum resource unit being composed of one subcarrier for the length of one OFDM/SC-FDMA symbol.

In the new radio system 5G-NR, for each numerology and carrier, a resource grid of subcarriers and OFDM symbols is defined for each of uplink and downlink. Each element in the resource grid is called a resource element and is identified based on the frequency index in the frequency domain and the symbol position in the time domain (see 3GPP TS 38.211 v15.6.0).

<5G NR Functional Split Between NG-RAN and 5GC>

Figure 7:
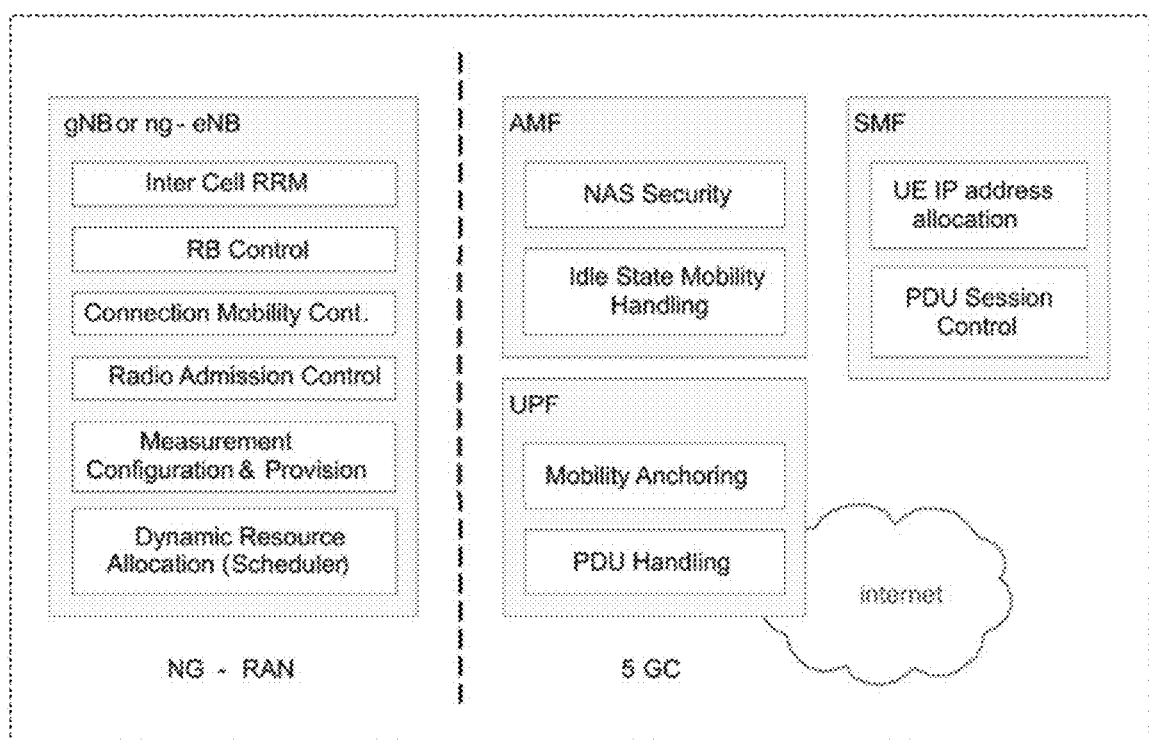
FIG. 7 is a schematic diagram illustrating functional split between NG-RAN and 5GC.

FIG. 7 illustrates functional split between NG-RAN and 5GC. An NG-RAN logical node is a gNB or ng-eNB. The 5GC has logical nodes AMF, UPF, and SMF.

For example, the gNB and ng-eNB host the following main functions:

Functions for radio resource management such as radio bearer control, radio admission control, connection mobility control, dynamic allocation of resources to UEs in both uplink and downlink (scheduling);
IP header compression, encryption, and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or Operation, Admission, Maintenance (OAM));
Measurement and measurement reporting configuration for mobility and scheduling;
Transport level packet marking in the uplink;
Session management;
Support of network slicing;
QoS Flow management and mapping to data radio bearers;
Support of UEs in RRC_INACTIVE state;
Distribution function for NAS messages;
Radio access network sharing;
Dual Connectivity; and
Tight interworking between NR and E-UTRA.

The access and mobility management function (AMF) hosts the following main functions:

Non-Access Stratum (NAS) signaling termination function;
NAS signaling security;
Access Stratum (AS) security control;
Inter Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

Furthermore, the user plane function (UPF) hosts the following main functions:

Anchor point for intra-/inter-RAT mobility (when applicable);
External protocol data unit (PDU) session point of interconnect to a data network;
Packet routing and forwarding;
Packet inspection and user plane part of policy rule enforcement;
Traffic usage reporting;
Uplink classifier to support outing traffic flows to a data network;
Branching point to support multi-homed PDU session;
QoS handling for user plane (e.g. packet filtering, gating, and UL/DL rate enforcement);
Uplink traffic verification (SDF to QoS flow mapping); and
Downlink packet buffering and downlink data indication triggering.

Finally, the session management function (SMF) hosts the following main functions:

Session management;
UE IP address allocation and management;
Selection and control of UPF;
Configuration function of traffic steering at a user plane function (UPF) to route traffic to proper destination;
Control part of policy enforcement and QoS; and
Downlink data indication.

<RRC Connection Setup and Reconfiguration Procedures>

Figure 8:
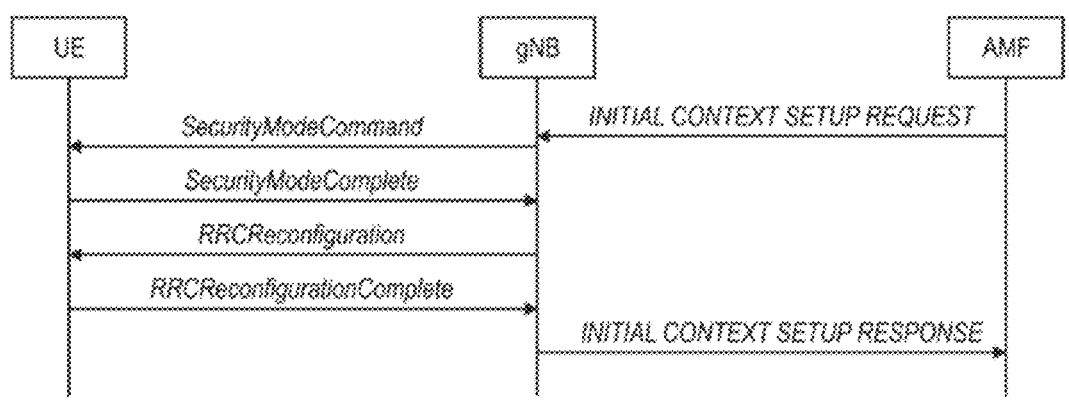
FIG. 8 is a sequence diagram for radio resource control (RRC) connection setup/reconfiguration procedures.

FIG. 8 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. This transition involves that the AMF prepares the UE context data (including, for example, PDU session context, security key, UE radio capability, and UE security capabilities, etc.) and transmits the UE context data to the gNB with an INITIAL CONTEXT SETUP REQUEST. Then, the gNB activates the AS security with the UE, which is performed by the gNB transmitting a SecurityModeCommand message to the UE and by the UE responding to the gNB with a SecurityModeComplete message. Afterwards, the gNB performs the reconfiguration to set up the Signaling Radio Bearer 2 (SRB2) and Data Radio Bearer(s) (DRB(s)) by transmitting an RRCReconfiguration message to the UE and, in response, receiving an RRCReconfigurationComplete from the UE. For a signaling-only connection, the steps relating to the RRCReconfiguration are skipped since the SRB2 and DRBs are not setup. Finally, the gNB indicates to the AMF that the setup procedure is completed with an INITIAL CONTEXT SETUP RESPONSE.

In the present disclosure, thus, an entity (e.g., AMF, SMF, etc.) of the 5th Generation Core (5GC) is provided that includes control circuitry, which, in operation, establishes a Next Generation (NG) connection with a gNodeB, and a transmitter, which in operation, transmits an initial context setup message, via the NG connection, to the gNodeB to cause a signaling radio bearer setup between the gNodeB and user equipment (UE). In particular, the gNodeB transmits a radio resource control (RRC) signaling containing a resource allocation configuration information element (IE) to the UE via the signaling radio bearer. The UE then performs an uplink transmission or a downlink reception based on the resource allocation configuration.

<Usage Scenarios of IMT for 2020 and Beyond>

Figure 9:
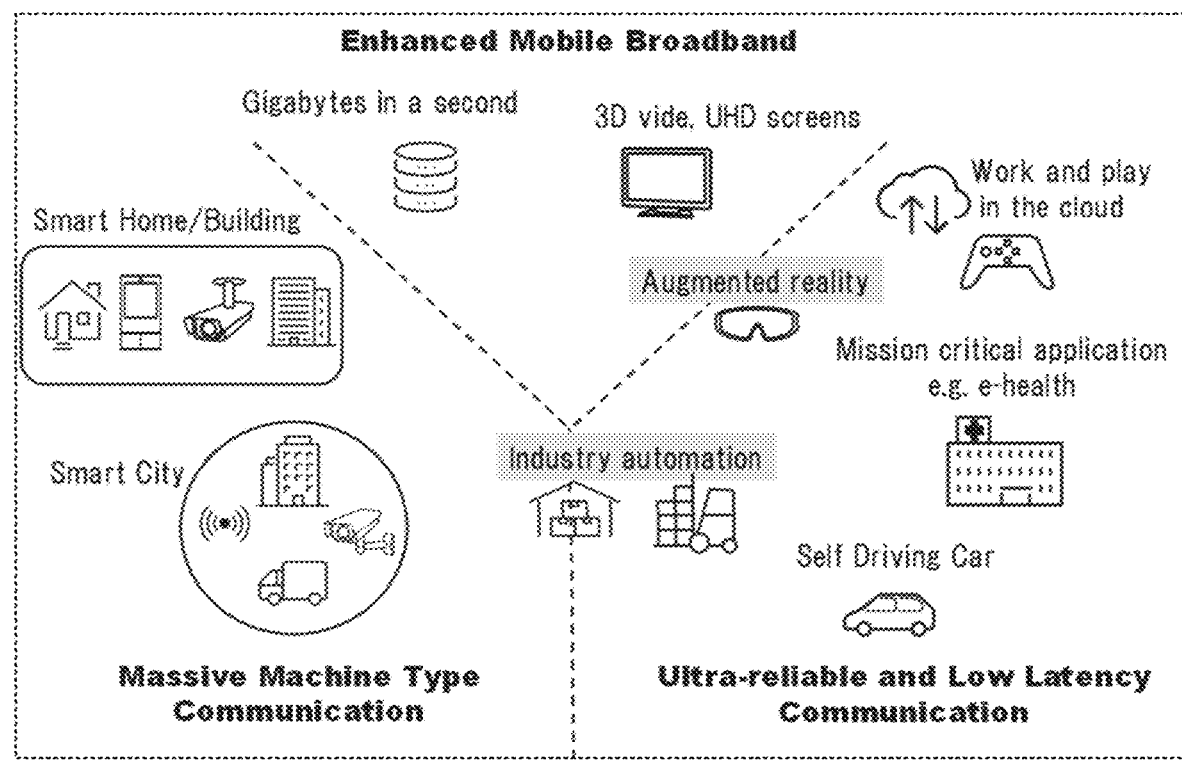
FIG. 9 is a schematic diagram illustrating usage scenarios of enhanced mobile broadband (eMBB), massive machine type communications (mMTC), and ultra reliable and low latency communications (URLLC)

FIG. 9 illustrates some of the use cases for 5G NR, In the 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 9 illustrates some examples of envisioned usage scenarios for IMT for 2020 and beyond (see, for example, ITU-R M. 2083 FIG. 2).

The URLLC use case has stringent requirements for capabilities such as throughput, latency, and availability. The URLLC use case has been envisioned as one of element techniques to enable future vertical applications such as wireless control of industrial manufacturing or production processes, remote medical surgery, distribution automation in a smart grid, transportation safety, etc. Ultra-reliability for the URLLC is to be supported by identifying the techniques to meet the requirements set by TR 38.913. For NR URLLC in Release 15, key requirements include a target user plane latency of 0.5 ms for uplink (UL) and 0.5 ms for downlink (DL). The general URLLC requirement for one transmission of a packet is a block error rate (BLEB) of 1E-5 for a packet size of 32 bytes with a user plane latency of 1 ms.

From the physical layer perspective, reliability can be improved in a number of possible ways. The current scope for improving the reliability involves defining separate CQI tables for the URLLC, more compact DCI formats, repetition of PDCCH, etc. However, the scope may widen for achieving ultra-reliability as the NR becomes more stable and developed (for NR URLLC key requirements). Particular use cases of NR URLLC in Release 15 include augmented reality/virtual reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. The pre-emption means that a transmission for which resources have already been allocated is stopped, and the already allocated resources are used for another transmission that has been requested later but has lower latency/higher priority requirements. Accordingly, the already granted transmission is replaced with a later transmission. The pre-emption is applicable independent of the particular service type. For example, a transmission for a service-type A (URLLC) may be replaced with a transmission for a service type B (such as eMBB). Technology enhancements with respect to reliability improvement include dedicated CQI/MCS tables for the target BLER of 1E-5.

The use case of the mMTC (massive machine type communication) is characterized by a very large number of connected devices typically transmitting a relatively low volume of non-delay sensitive data. Devices are required to be low cost and to have a very long battery life. From the NR perspective, utilizing very narrow bandwidth parts is one possible solution to have power saving from the UE perspective and enable the long battery life.

As mentioned above, it is expected that the scope of reliability improvement in NR becomes wider. One key requirement to all the cases, and especially necessary for the URLLC and mMTC for example, is high reliability or ultra-reliability. Several mechanisms can be considered to improve the reliability from the radio perspective and network perspective. In general, there are a few key important areas that can help improve the reliability. These areas include compact control channel information, data/control channel repetition, and diversity with respect to the frequency, time, and/or spatial domain. These areas are applicable to reliability improvement in general, regardless of particular communication scenarios.

For NR URLLC, further use cases with tighter requirements have been considered such as factory automation, transport industry, and electrical power distribution. The tighter requirements are higher reliability (up to 10-6 level), higher availability, packet size of up to 256 bytes, time synchronization down to the order of a few μs where the value can be one or a few μs depending on frequency range and short latency in the order of 0.5 to 1 ms (e.g., target user plane latency of 0.5 ms) depending on the use cases.

Moreover, for NR URLLC, several technology enhancements from the physical layer perspective have been identified. These technology enhancements include Physical Downlink Control Channel (PDCCH) enhancements related to compact DCI, PDCCH repetition, and increased PDCCH monitoring. In addition, Uplink Control Information (UCI) enhancements are related to enhanced Hybrid Automatic Repeat Request (HARQ) and CSI feedback enhancements. Also, PUSCH enhancements related to mini-slot level hopping and retransmission/repetition enhancements have been identified. The term "mini-slot" refers to a transmission time interval (TTI) including a smaller number of symbols than a slot (a slot includes fourteen symbols).

<QoS Control>

The 5G Quality of Service (QoS) model is based on QoS flows and supports both QoS flows that require guaranteed flow bit rate (GBR QoS flows) and QoS flows that do not require guaranteed flow bit rate (non-GBR QoS Flows). At the NAS level, the QoS flow is thus the finest granularity of QoS differentiation in a PDU session. A QoS flow is identified within a PDU session by a QoS flow ID (QFI) carried in an encapsulation header over the NG-U interface.

For each UE, the 5GC establishes one or more PDU sessions. For each UE, the NG-RAN establishes at least one Data Radio Bearer (DRB) together with the PDU session, for example as illustrated above with reference to FIG. 8. Additional DRB(s) for QoS flows) of that PDU session can be subsequently configured (it is up to NG-RAN when to do so). The NG-RAN maps packets belonging to different PDU sessions to different DRBs. NAS level packet filters in the UE and 5GC associate UL and DL packets with QoS flows, whereas AS-level mapping rules in the UE and in the NG-RAN associate UL and DL QoS flows with DRBs.

Figure 10:
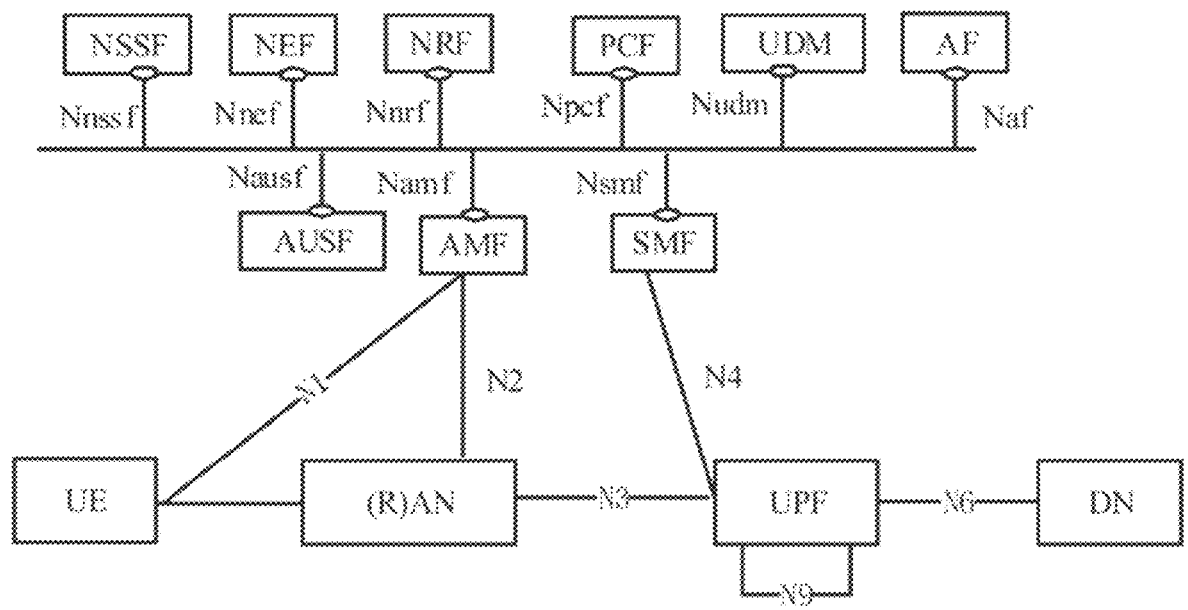
FIG. 10 is a block diagram illustrating an exemplary 5G system architecture for a non-roaming scenario.

FIG. 10 illustrates a 5G NR non-roaming reference architecture (see TS 23.501 v16.1.0, section 4.23). An Application Function (AF), e.g. an external application server hosting 5G services exemplified in FIG. 9, interacts with the 3GPP core network in order to provide services, for example, to support application influence on traffic routing, accessing a Network Exposure Function (NEF) or interacting with the policy framework for policy control (see Policy Control Function, PCF), e.g. QoS control. Based on operator deployment, application functions considered to be trusted by the operator can be allowed to interact directly with relevant network functions. Application functions not allowed by the operator to access directly the network functions use the external exposure framework via the NEF to interact with relevant network functions.

FIG. 10 illustrates further functional units of the 5G architecture, namely a Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access, or 3rd party services. All of or a part of the core network functions and the application services may be deployed and running on cloud computing environments.

In the present disclosure, thus, an application server (for example, AF of the 5G architecture), is provided that includes a transmitter, which in operation, transmits a request containing a QoS requirement for at least one of the URLLC, eMMB, and mMTC services to at least one of functions (for example NEF, AMF, SMF, PCF, UPF, etc) of the 5GC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure includes: reception circuitry, which, in operation, receives a parameter related to an unlicensed band; and control circuitry, which, in operation, determines information to be included in uplink control information, based on the parameter.

In an embodiment of the present disclosure, the control circuitry configures either a first mode in which the uplink control information including information on retransmission control is transmitted or a second mode in which the uplink control information not including at least part of the information on the retransmission control is transmitted.

In an embodiment of the present disclosure, the parameter indicates either the first mode or the second mode.

In an embodiment of the present disclosure, the reception circuitry receives a semi-static control signal including the parameter.

In an embodiment of the present disclosure, the reception circuitry receives a dynamic control signal including the parameter.

In an embodiment of the present disclosure, the parameter is a parameter on a priority in a configuration of allocation of a resource configured to the terminal.

In an embodiment of the present disclosure, the parameter is a parameter on a channel access scheme.

In an embodiment of the present disclosure, the parameter is a parameter on a modulation and coding scheme.

In an embodiment of the present disclosure, the parameter is a parameter indicating whether an environment is a controlled environment.

A communication method according to an embodiment of the present disclosure includes: receiving, by a terminal, a parameter related to an unlicensed band; and determining, by the terminal, information to be included in uplink control information, based on the parameter.

The disclosure of Japanese Patent Application No. 2020-022297, filed on Feb. 13, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 201 Receiver
102 Separator
103 Control information demodulator/decoder
104 Data demodulator/decoder
105 Scheduler
106, 203 Control information holder
107 Data/control information generator
108 Encoder/modulator
109, 208 Transmitter
200 Terminal
202 Demodulator/decoder
204 Transmission controller
205 Data generator
206 Control information generator
207 Encoder/modulator/multiplexer

The invention claimed is:

1. A terminal comprising:
reception circuitry, which, in operation, receives a parameter related to a configured grant of an unlicensed band; and
control circuitry, which, in operation, determines information to be included in uplink control information, based on the parameter.

2. The terminal according to claim 1, wherein the control circuitry configures either a first mode in which the uplink control information including information on retransmission control is transmitted or a second mode in which the uplink control information not including at least part of the information on the retransmission control is transmitted.

3. The terminal according to claim 2, wherein the parameter indicates either the first mode or the second mode.

4. The terminal according to claim 1, wherein the reception circuitry receives a higher layer signaling including the parameter.

5. The terminal according to claim 1, wherein the control circuitry determines whether the uplink control information includes configured grant-uplink control information (CG-UCI) based on the parameter.

6. The terminal according to claim 5, wherein the CG-UCI includes a HARQ process number, a new data indicator (NDI) and a redundancy version (RV).

7. The terminal according to claim 5, wherein a retransmission timer is configured in a case where the CG-UCI is included in the uplink control information, and the retransmission timer is not configured in a case where the CG-UCI is not included in the uplink control information.

8. The terminal according to claim 1, wherein the parameter further indicates whether the terminal receives downlink feedback information (DFI) for a configured grant-physical uplink shared channel (CG-PUSCH).

9. A communication method, comprising:
receiving, by a terminal, a parameter related to a configured grant of an unlicensed band; and
determining, by the terminal, information to be included in uplink control information, based on the parameter.

* * * * *